March 8, 1966   F. C. GREENE   3,238,558
TILTED AXLE CASTER BRAKE
Filed May 27, 1964   2 Sheets-Sheet 1
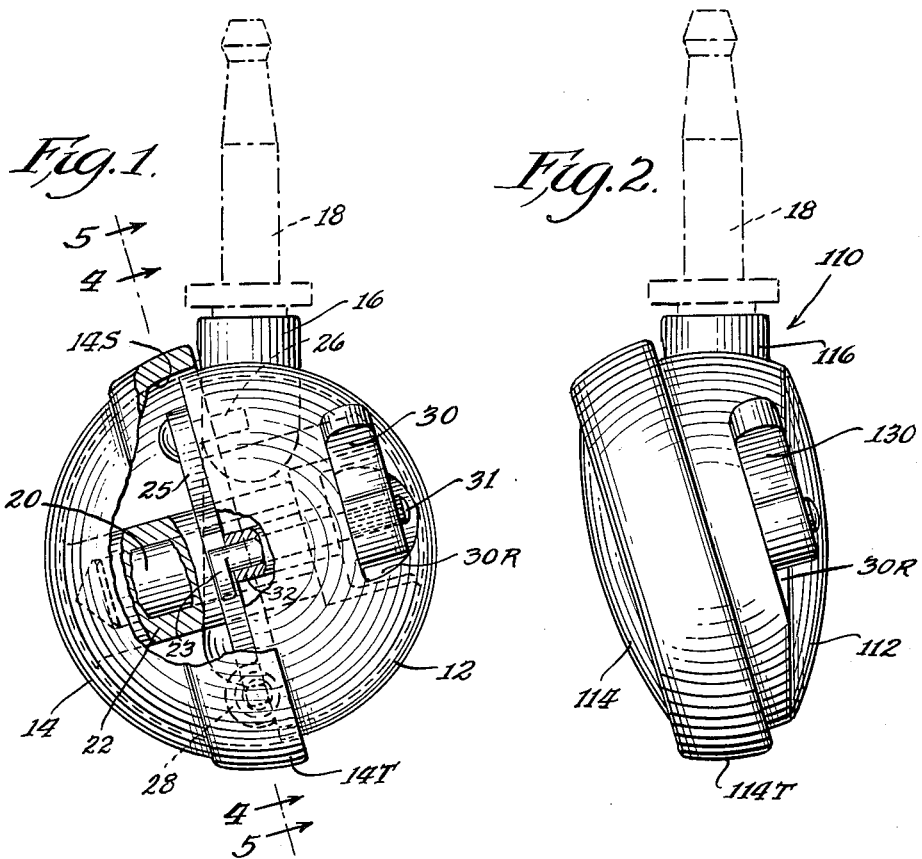
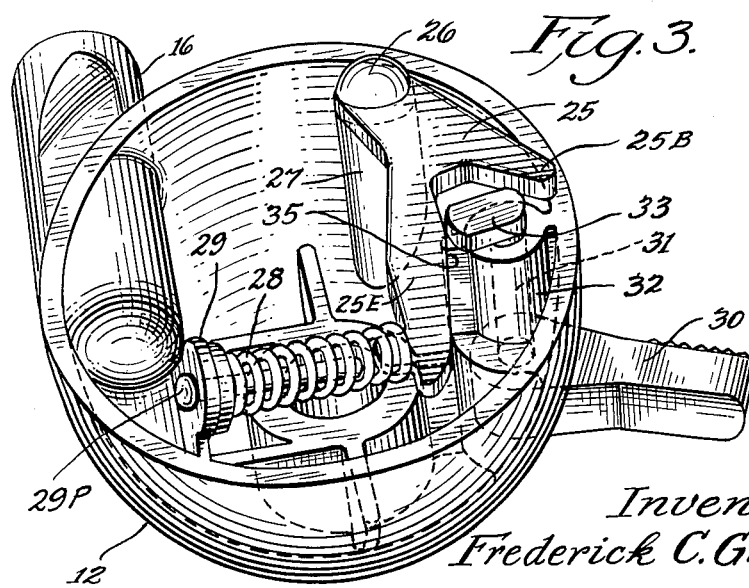
Inventor
Frederick C. Greene
By Mann, Brown & McWilliams
Attys.

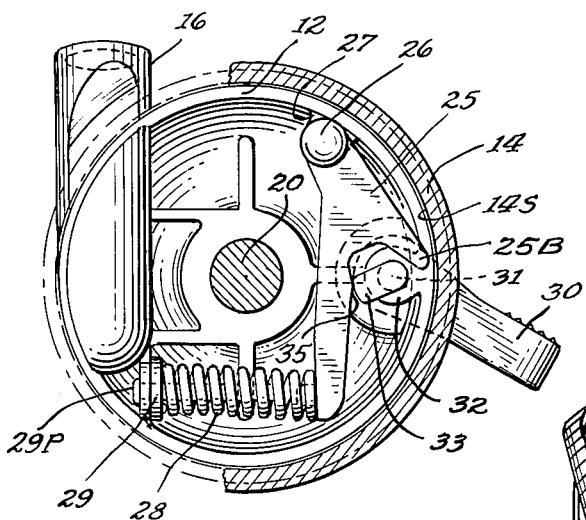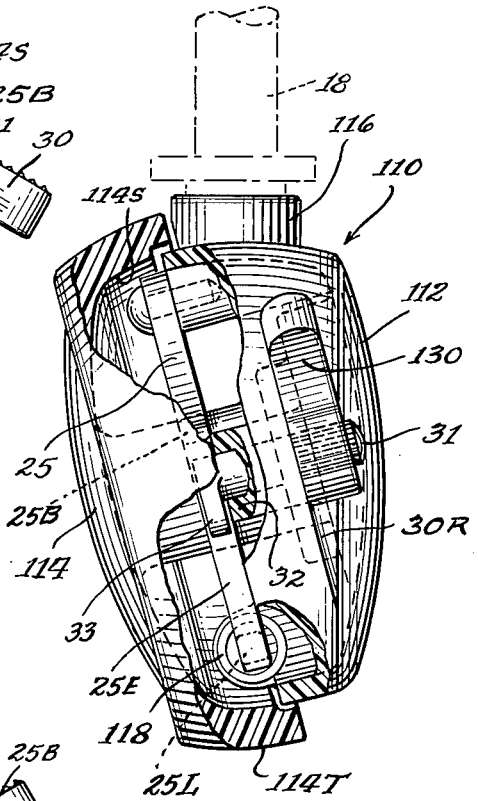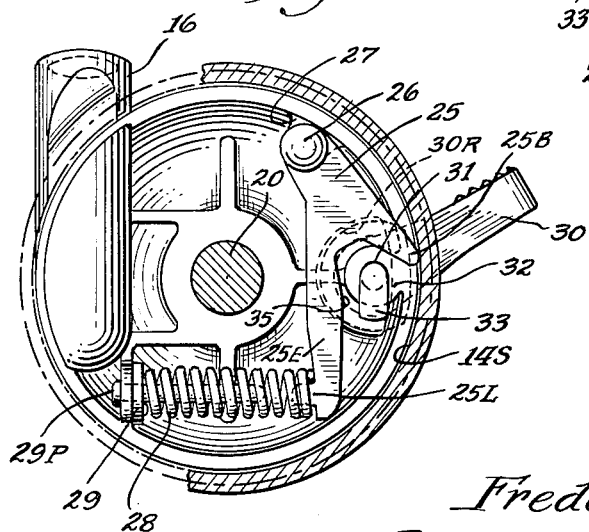

United States Patent Office 3,238,558
Patented Mar. 8, 1966

3,238,558
TILTED AXLE CASTER BRAKE
Frederick C. Greene, St. Joseph, Mich., assignor to Shepherd Casters, Inc., a corporation of Michigan
Filed May 27, 1964, Ser. No. 370,406
4 Claims. (Cl. 16—35)

This invention relates to a tilted axle caster of the fully enclosed type, and particularly to a brake mechanism for such casters.

Tilted axle casters of the enclosed type have taken different forms, and in one of such forms the caster comprises a two-part substantially spherical body that provides a caster body and a caster wheel which in assembled relationship has a substantially spherical appearance. In other forms the hollow caster body and the caster wheel are flattened to some extent but, in the main, the modified design functions substantially the same as the fully spherical caster.

Efforts have been made to provide a brake for such casters and it has been found that most such brakes as heretofore provided have been unsatisfactory. In view of the foregoing it is the primary object of the present invention to provide an improved brake for hollow tilted axle casters, and an object related to the foregoing is to provide such brake that is simple in character and which will attain the desired braking operation even when the caster wheel is somewhat out-of-round due to inaccuracy in manufacture or subsequent changes in form.

Other and further objects of the present invention will be apparent from the following description and claims, and are illustrated in the accompanying drawings, which, by way of illustration show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a front elevational view of a hollow tilted axle of spherical form in which a brake embodying the present invention has been included;

FIG. 2 is a generally similar elevational view of a somewhat flattened design of a hollow bodied tilted axle caster embodying a brake according to the present invention;

FIG. 3 is a perspective view of the open face of the caster body shown in FIG. 1;

FIG. 4 is an elevational view of the open face of the caster body shown in FIG. 3; and the brake mechanism being shown in its released position;

FIG. 5 is a view similar to FIG. 4 showing the brake in its effective or applied position; and FIG. 6 is a view similar to FIG. 1 and illustrating internal details of the caster and brake mechanism shown in FIG. 2.

For purposes of disclosure the invention is herein illustrated as embodied in two different designs of hollow bodied tilted axle casters, the invention being shown in FIG. 1 and FIGS. 3 to 5 as embodied in a truly spherical caster 10, while in FIGS. 2 and 6, the invention is illustrated as embodied in a somewhat flattened design of hollow bodied tilted axle casters 110.

As shown in FIGS. 1 and 3 to 5, the caster 10 has a generally semi-spherical caster wheel 14, both of which are hollow, and the caster body 12 and the caster wheel 14 are put in face to face relationship so as to form a generally spherical outline as will be described in further detail. The caster body 12 has an upright socket structure 16 formed therein adapted to receive a vertical caster pivot 18, and the open face or side of the caster body is disposed at an angle to the vertical plane passing through the axis of the socket 16 and the pivot pin 18.

The caster body 12 has a tilted axle 20 rigidly fixed within the caster body 12 in perpendicular relationship to the open side of the caster body and centered with respect to this open side. The axle 20 is embraced by a bearing sleeve 22 that is molded integrally with the caster wheel 14 concentric with the open side wall of the caster wheel and perpendicular to the open face of the caster wheel. The bordering edge of the caster wheel 14 has a tread portion 14T which serves as the tread for the caster wheel, and the inner surface 14S of the tread is exposed adjacent the open edge of the caster body 12 so as to in effect provide an annular braking surface.

Under the present invention the braking mechanism is mounted on the caster body 12 and has a braking element that is adapted to be engaged with the braking surface 14S to hold the caster wheel 14 against rotation. Thus, as shown in FIGS. 1 and 3 to 5, the braking mechanism is provided by a brake arm 25, that is pivoted on a pivot pin 26 that extends through one end of the brake lever 25 and into a suitable molded pedestal 27 formed in the caster body 12 parallel to the axis of the axle 20 and adjacent the upper side of the caster body 12. The brake lever 25 is supported with its right hand face, as viewed in FIG. 1, substantially in the plane of the open face of the caster body 12 so that a braking arm 25B on the lever may be swung from the released position of FIG. 4 into the position of FIG. 5 and into braking engagement with the inner surface 14S of the caster wheel. The braking lever 25 has an extension 25E formed thereon so as to extend downwardly as shown in FIGS. 4 and 5, and an expansive coil spring 28 acts between an abutment 29 and the lower end of the extension 25E to urge the brake lever 25 yieldingly in a counterclockwise direction toward its braking position of FIG. 5. The spring 28 is supported and guided by a lug 25L and a supporting pin 29P so that it will be held in position as the brake lever 25 is moved back and forth.

As above pointed out the spring 28 normally urges the brake lever 25 toward its braking or applied position, and when it is desired to release the brake, the arm 20E is positively actuated in a clockwise direction and is locked in a brake-release position such as that shown in FIG. 4 of the drawings.

Such control of the brake lever 25 is attained by a brake operating lever 30 that is fixed in a rotative sense on one end of a shaft 31 that is mounted so as to project axially through a support pedestal 32 that is molded as a part of the caster body and which is disposed so as to be perpendicular to the open face of the caster body and parallel to the pivot 26 and the axle 20. At its left hand end, as viewed in FIG. 1, the shaft 31 has a radial cam arm 33 fixed thereon so that it will rotate with the shaft 31, and this arm 33 is adapted to cooperate with a cam surface 35 formed on the adjacent face of the extension 25E. Thus, when the brake is applied, the brake operating lever 30 is in its upper position of FIG. 5, and the spring 28 rocks the brake lever 25 in a counterclockwise direction so that the braking end 25B of the lever 25 is urged yieldingly into engagement with the braking surface 14S. Thus, proper engagement of the brake lever 25 with the braking surface 14S of the caster wheel 14 is assured even though the caster wheel may be somewhat out-of-round due to manufacturing inaccuracies or due to other causes such as a change of form after manufacture of the caster.

When the brake is to be released, the lever 30 is forced downwardly, as viewed in FIGS. 4 and 5, so as to move the same from the position shown in FIG. 5 to the position shown in FIG. 4. When this is done, the cam arm 33 engages the cam surface 35 and moves the brake lever 25 in a clockwise direction, thus to release the brake and allow the caster wheel 14 to turn freely.

As will be evident in the drawings the end of the operating lever 30 that is connected to the shaft 31 is set in a recess 30R in the outer surface of the caster body 12, and the operating lever 30 is pivoted back and forth within the recess. When the operating lever 30 is pressed downwardly to release the brake, the cam 33 engages the cam surface 35 and pivots the brake arm to its released position. At this time the cam surface 35 acts against a rounded corner of the cam arm 33 and the yielding face is directed toward the axis of the shaft 31. This force therefore tends to hold the parts in the positions to which they have been moved, and yet a relatively small upward force on the lever 30 serves to shift the cam 33 and cause application of the brake.

In FIGS. 2 and 6 of the drawing a similar braking structure is shown with respect to the flat design of enclosed tilted axle caster 110, and in general it may be pointed out that the relationship of the brake mechanism to the caster body and to the caster wheel is precisely like that described hereinbefore. Thus the flattened caster 110 has a caster body 112 and a flattened caster wheel 114, and the tread 114T of the caster wheel has an internal braking surface 114S as will be evident in FIG. 6 of the drawings.

As shown in FIGS. 2 and 6, a similar brake lever 25 is mounted on the caster 112, and this brake lever 25 is spring actuated by a spring 118 toward a brake engaging position. The yieldingly induced engagement of the brake lever 25 is controlled in this instance by a lever and cam system of the same kind as that described with respect to the other embodiment of the invention. Thus, the operating lever 130 of the brake as shown in FIGS. 2 and 6 may be foot operated to its released or non-braking position by mere downward foot pressure on the operating arm 130, and upon release of the brake in this manner, such a released relationship of the brake mechanism is maintained in the same general manner as hereinbefore described particularly with respect to FIG. 5 of the drawings. When the brake mechanism shown in FIGS. 2 and 6 is to be applied, the operating arm 130 is moved upwardly to the position shown in FIG. 2, and this allows the brake lever 25 to be spring actuated by the spring 118 toward a braking position wherein the end of the brake lever 25 engages the inner surface 114S of the tread of the caster wheel 114 to prevent rotation of the caster wheel. The braking mechanism of the present invention will be recognized as being quite simple in character, and moreover, it will be noted that the brake mechanism may be quickly and easily applied or released where this is required as in hospitals and the like. The brake of this invention, while simple in character, provides for an effective brake action when the brake is set despite even when the caster wheel happens to be out-of-round.

From the foregoing description it will be apparent that the present invention provides new and improved hollow bodied casters of the tilted axle type, and it will be noted in particular that the present invention provides an improved caster which has the means for achieving the desired braking action, and yet has the highly decorative form and appearance that is usually expected in hollow bodied tilted axle casters.

Thus while preferred embodiments of the invention have been illustrated heerin, it is to be understood that changes and variations may be made by those skilled in the art without departing from the spirit and scope of the appended claims.

I claim:

1. In an enclosed tilted axle caster, a cup-like hollow caster body having an edge defining an open face, a cup-like hollow caster wheel having an edge defining an open face, said open faces being disposed adjacent and parallel to each other, cooperating bearing sleeve and axle elements rigid respectively with said body and said wheel and perpendicular to and centered on said open faces to mount the caster wheel for rotation with respect to the caster body, means on said caster body defining a vertical castering axis for the caster body, a brake member mounted on said caster body for movement between a braking position wherein said member engages an inner surface of the caster wheel and a released position wherein the member is spaced from said surface, spring means mounted in said caster body urging the brake member to its braking position, and operating means on said caster body including an arm located externally of the caster body for shifting said brake member positively to said released position.

2. In an enclosed tilted axle caster, a cup-like hollow caster body having an edge defining an open face, a cup-like hollow caster wheel having an edge defining an open face, said open faces being disposed adjacent and parallel to each other, said caster wheel having an internal annular braking surface thereon adjacent to the said edge of the wheel, cooperating bearing sleeve and axle elements rigid respectively with said body and said wheel and perpendicular to and centered on said open faces to mount the caster wheel for rotation with respect to the caster body, means on said caster body defining a vertical castering axis for the caster body, a brake member pivoted within said caster body on an axis parallel to said axle for pivotal movement between a braking position wherein said member engages said internal braking surface of the caster wheel and a released position wherein the member is spaced from said braking surface, spring means mounted in said caster body urging the brake member to its braking position, operating means including a cam pivoted within said caster body on an axis parallel to said axle and movable to a releasing position where said cam engages and shifts the brake member positively to said released position, and an operating arm located externally of the caster body for operating said cam.

3. In an enclosed tilted axle caster in which a cup-like hollow caster body and a cup-like hollow caster wheel each have an edge defining an open face are arranged with said open faces being disposed adjacent and parallel to each other, and in which bearing sleeve and axle elements rigid respectively with said body and said wheel and perpendicular to and centered on said open faces cooperate to mount the caster wheel for rotation with respect to the caster body, and in which means on said caster body define a vertical castering axis for the caster body, the combination of a brake member mounted on said caster body for movement between a braking position wherein said member engages on inner surface of the caster wheel and a released position wherein the member is spaced from said surface, spring means mounted in said caster body urging the brake member to its braking position, a pivoted operating arm mounted on said caster body externally thereof, and a cam arm operated by said arm for shifting said brake member positively to said released position.

4. In an enclosed tilted axle caster, a cup-like hollow caster body having an edge defining an open face, a cup-like hollow caster wheel having an edge defining an open face, said open faces being disposed adjacent and parallel to each other, said caster wheel having an internal annular braking surface thereon adjacent to the said edge of the wheel, cooperating bearing sleeve and axle elements rigid respectively with said body and said wheel and perpendicular to and centered on said open faces to mount the caster wheel for rotation with respect to the caster body, means on said caster body defining a vertical castering axis for the caster body, a brake member in the form of a bell crank pivoted within said caster body on an axis parallel to said axle for pivotal movement between a braking position wherein one arm of said bell crank engages said internal braking surface of the caster wheel and a released position wherein said one arm of the bell crank is spaced from said braking surface, spring means mounted in said caster body and acting on the other arm of the bell crank to urge the brake member to its braking position, operating means including a cam pivoted within said caster body on an axis parallel to said axle and movable to a brake releasing position where said cam engages said other arm of the bell crank to shift the brake member positively to said released position, and an operating arm located externally of the caster body for operating said cam.

References Cited by the Examiner

UNITED STATES PATENTS

| | | | |
|---|---|---|---|
| 2,226,090 | 12/1940 | Burdett | 188—166 |
| 2,253,824 | 4/1941 | Townsend | 16—35 |
| 2,445,865 | 7/1948 | Sleeper et al. | 16—35 |
| 2,616,528 | 11/1952 | Swanson | 188—166 |

JOSEPH D. SEERS, *Primary Examiner.*

DONLEY J. STOCKING, *Examiner.*